United States Patent
Roach

[11] Patent Number: 5,931,050
[45] Date of Patent: Aug. 3, 1999

[54] APPARATUS AND METHODS FOR RUNOUT COMPENSATION

[75] Inventor: James A. Roach, Richmond, Va.

[73] Assignee: ACCU Industries, Inc., Ashland, Va.

[21] Appl. No.: 08/796,077

[22] Filed: Feb. 5, 1997

Related U.S. Application Data

[63] Continuation of application No. 08/283,775, Aug. 1, 1994, Pat. No. 5,615,589.

[51] Int. Cl.⁶ .............................. G05G 1/00; F16F 15/22
[52] U.S. Cl. ............................................ 74/572; 74/573 R
[58] Field of Search .................... 74/595, 569, 572–574; 82/112, 146, 151; 269/59

[56] References Cited

U.S. PATENT DOCUMENTS

| | | |
|---|---|---|
| 1,579,582 | 4/1926 | Voltz . |
| 3,564,240 | 2/1971 | Thomas . |
| 3,826,047 | 7/1974 | Binder . |
| 4,066,246 | 1/1978 | Korstvedt ................................ 366/293 |
| 4,165,662 | 8/1979 | Besenbruch et al. . |
| 4,455,900 | 6/1984 | Callanan et al. . |
| 4,493,231 | 1/1985 | Wossner . |
| 4,630,149 | 12/1986 | Ida ........................................ 360/96.4 |
| 4,708,041 | 11/1987 | Granger . |
| 4,951,526 | 8/1990 | Linder ................................... 74/573 R |
| 5,074,723 | 12/1991 | Massa et al. ...................... 74/573 R X |
| 5,277,546 | 1/1994 | Frey et al. ............................ 74/572 X |
| 5,555,144 | 9/1996 | Wood et al. ........................ 360/98.08 |
| 5,615,589 | 4/1997 | Roach . |

OTHER PUBLICATIONS

Brochure, "535620 Universal Hubless and Composite Rotor Adapter," Accu Industries, Inc. (facsimile date of Jul. 13, 1990).
Brochure, "Tru–Chuck® TC–900/Hubless Adaptor/Composite Adaptor," Midas Tool Co. (1989).
Brochure, "AMMCO® Hubless Rotor Adaptor Set," (Jul. 1989).
Brochure, "Hubless Adaptor Kit," Rels Manufacturing Inc. (facsimile date of Jul. 13, 1990).

*Primary Examiner*—Vinh T. Luong
*Attorney, Agent, or Firm*—James L. Ewing, IV; Kilpatrick Stockton LLP

[57] ABSTRACT

A runout compensator is provided that angulates a face surface by adjusting two members whose mating surfaces have been machined to slant relative to the central axis of each member. A first member has a shaft over which slides the second member so that the mating surfaces of each member come into and are maintained in contact. Rotating the second member about the shaft of the first member varies the angulation of a face surface. Correctly adjusting the runout compensator, which is attached to a lathe, and a load plate assembly providing biasing to hold the workpiece between itself and the runout compensator, allows the workpiece to be firmly held in the angled position needed to compensate for the runout in the workpiece as the workpiece is turned upon a lathe.

10 Claims, 3 Drawing Sheets

APPARATUS AND METHODS FOR RUNOUT COMPENSATION

This application is a continuation of U.S. Ser. No. 08/283,775, filed Aug. 1, 1994, by James A. Road, entitled "Apparatus and Methods for Runout Compensation" now U.S. Pat. No. 5,615,589.

This invention relates to a method and apparatus for compensating for the uneven surface of a workpiece, and more particularly for using a runout compensator to hold workpieces upon a lathe to thereby compensate for runout in the workpiece.

BACKGROUND OF THE INVENTION

Disc brake systems are used on many vehicles and usually employ a rotor and a hydraulic caliper system that force brake pads against the rotor to slow the velocity of the vehicle. Often the axis of the rotor is not perfectly aligned (e.g., perpendicular) with the brake caliper. Uneven wear is thus caused on the surfaces of the rotor as the pads of the brake caliper are applied to the misaligned rotor. Similarly, improper use of brakes may cause overheating of the rotor, increasing the likelihood that the rotor's surfaces may become warped or develop high and low spots. Uneven wear, or runout as seen by the brake caliper, on the rotor's surfaces is undesirable as it causes squealing, pedal pulsation, vibration and otherwise decreases the efficiency and life of a disc brake system.

Conventionally, unevenly worn rotors are removed and turned or machined on a lathe, such as the precision bench lathes provided by Accu Industries, Inc. of Richmond, Va. Before machining, the rotor is constrained so that the axis (center line) of the rotor is parallel to the arbor (axis) of the lathe, a process known as "truing." A machining tool is located perpendicular to the spindle of the lathe. Upon securing the rotor with a centering cone and bell clamps, the machining tool is brought into contact with the surface of the rotor. Machining the rotor in this way results in a rotor whose surfaces are perpendicular, or true, to the axis of the rotor.

However, when the machined rotor is replaced on a vehicle whose axle is not perfectly perpendicular to the brake caliper, the brake caliper will be misaligned with the surface of the rotor rather than in the desired parallel relation. The surfaces of the rotor will be skewed with respect to the brake pads of the caliper, which will therefore bear harder or softer on particular portions of the rotor as the brakes are operated. As a result, the brake caliper pads will simply reintroduce into the brake rotor the same undesirable unevenness that was removed by machining, or turning, the rotors. This results in a decreased life of the rotor, decreased brake system efficiency and concomitant increased costs in maintaining the vehicle's brake system. Potentially, this problem could be solved by simply assuring that the calipers are properly aligned with the vehicle's axis. Such precision is, however, difficult to achieve and costly to implement.

For brake rotors with uneven surfaces, the typical solution to these problems was to tilt the rotor about its axis so that its surfaces were parallel with the machining tool by providing shims between the holding clamps and the rotor. Essentially, the rotor is shimmed out so that its position on the lathe in relation to the machining tool is exactly the same as the rotor's position on the vehicle's axis in relation to the brake calipers. Numerous deficiencies are inherent in this approach, including the potential for misjudging the size of shim needed, with the result that it may cause greater or lesser skew in the rotor than is required to compensate for the runout, or the shim may loosen and become a dangerous flying object should the turning lathe cast it off. Similarly, the shim could be overly large and overlap into the area being resurfaced. Moreover, shims decrease the efficiency of the clamps, and as the lathe turns the unsatisfactorily constrained workpiece and a cutting or machining tool is applied, the workpiece likely will move out of its skewed position in which runout can be compensated. Consequently, if the workpiece shifts during machining runout is not compensated or, if the shift is sufficiently great, the workpiece could be dangerously ejected from the lathe.

In any event, shims, being merely an imprecise stop-gap for compensating for uneven surfaces, require expenditure of significant trial and error time and labor in selecting for each brake rotor the correctly sized shim. Moreover, because shims do not provide any way continuously to vary the amount of unevenness or runout that is being compensated, the user may have to try various shim sizes before the uneven surface of a brake rotor is fully compensated. In short, placing shims correctly into the clamp holding the brake rotors is an awkward, time consuming and unsafe procedure.

SUMMARY OF THE INVENTION

The present invention offers a method of operating a runout compensator apparatus so that objects with uneven surfaces may be firmly held and machined within a lathe. The runout compensator also compensates for rotor runout or unevenness caused by the misalignment (i.e., skew relation) between the rotor's surfaces and the brake caliper.

The runout compensator has a first member, such as an inner ring, that mates with a second member, such as an outer ring. The mating surfaces of the inner and outer rings are machined so that they are not perpendicular to the axis of the rings (i.e., the mating surfaces slant or tilt relative to the rings' axes). One of the rings has a shaft onto which the second ring fits and about which the second ring may twist relative to the first ring. When the two rings are joined with their mating surfaces in contact, two face surfaces are available. One of the face surfaces is a reference surface; the other of the face surfaces will angulate as the rings are twisted. Thus, in a starting, true position, the machined mating surfaces match so that the angulating surface of the entire compensator is perpendicular to the arbor. As the rings are twisted out of the true position, the angulating surface of the runout compensator "angulates" (moves out of perpendicular relation with the axis of the arbor) since the machined mating surfaces combine to cause angulation (a change in the angular relation of the face surface to the arbor's axis) of the angulating surface.

Controlling the angulation of the angulating surface by twisting the rings relative to one another allows the clamps to hold the brake rotor in the position needed in order to emulate the runout seen by the brake caliper without the necessity of impractical, inefficient and potentially dangerous shims. Reading match marks on the face of the compensator allows the user to determine the setting needed to provide the desired amount of runout. A chart translating the setting of the match marks into the amount of runout compensation provided for each particular brake rotor size may further simplify the adjustment for runout.

However, before using the runout compensator, the user first determines the amount of runout in the rotor needed to be compensated. This is accomplished by, among other methods, placing the rotor on the lathe and machining approximately a one inch (1") swath near the edge of the rotor without the compensator, thereby "truing" that swath of the rotor surface (i.e., making the machined area perpendicular to the axis of the rotor). Then the rotor is reattached to the vehicle and the user measures the highest and lowest portions of the rotor relative to the machined area.

After marking the high spot of the rotor, it is removed and mounted on a lathe with the runout compensator, clamps and a load plate assembly, which applies bias to maintain the rotor firmly between the clamps. Although a conventional centering cone with a spring of higher tension could be used to compress the rotor, bell clamps and runout compensator together, potentially the rotor could wobble if the tension is insufficient. The load plate assembly prevents such wobbling, thus maintaining the rotor in the correct reference position necessary to induce the proper degree of runout.

The runout compensator is then adjusted, making sure that its match marks are aligned with the high spot marked on the rotor, which assures that the angulation created by the runout compensator will correctly interface with the uneven surfaces of the rotor so that those surfaces are tilted to be parallel with the machining tool. After adjustment of the runout compensator, the load plate assembly's set screw (which prevents the load plate assembly from rotating about the arbor as the runout compensator is adjusted) is loosened, the arbor nut is tightened and the rotor is ready for machining. Greater efficiency, simplicity and safety is accordingly offered by the present invention since, among other improvements, clamps need no longer be shimmed to create runout and thus can better interface with the rotor or other workpiece.

It is therefore an object of this invention to provide a method for compensating for the uneven surface of a workpiece.

It is accordingly another object of the present invention to provide a runout compensator that can adjustably angulate a face surface.

It is an additional object of the present invention to provide a runout compensator for interfacing a workpiece and a lathe and compensating for runout in a workpiece, such as a disc brake rotor.

It is another object of the present invention to offer a method of quickly and efficiently operating the runout compensator with a lathe.

It is yet another object of the present invention to more firmly, and thus with increased safety, hold a workpiece to be machined upon a lathe.

It is a further object of this invention to provide for a lathe, a runout compensator and load plate assembly, which together interface with and hold firmly for machining various workpieces in which it is necessary to compensate for runout by tilting the workpiece an appropriate amount.

Other objects, features and advantages of this invention will become apparent with reference to the remainder of this document.

DETAILED DESCRIPTION OF THE DRAWINGS

Figure 1:
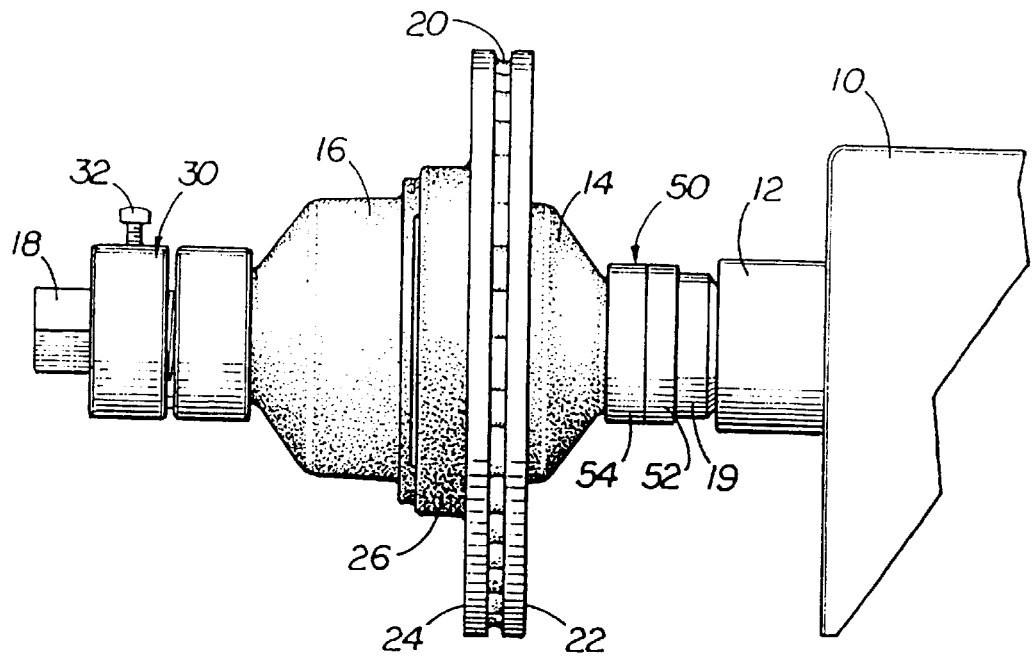
FIG. 1 is a side view of a lathe equipped with a runout compensator and a load plate assembly of the present invention.
Figure 2:
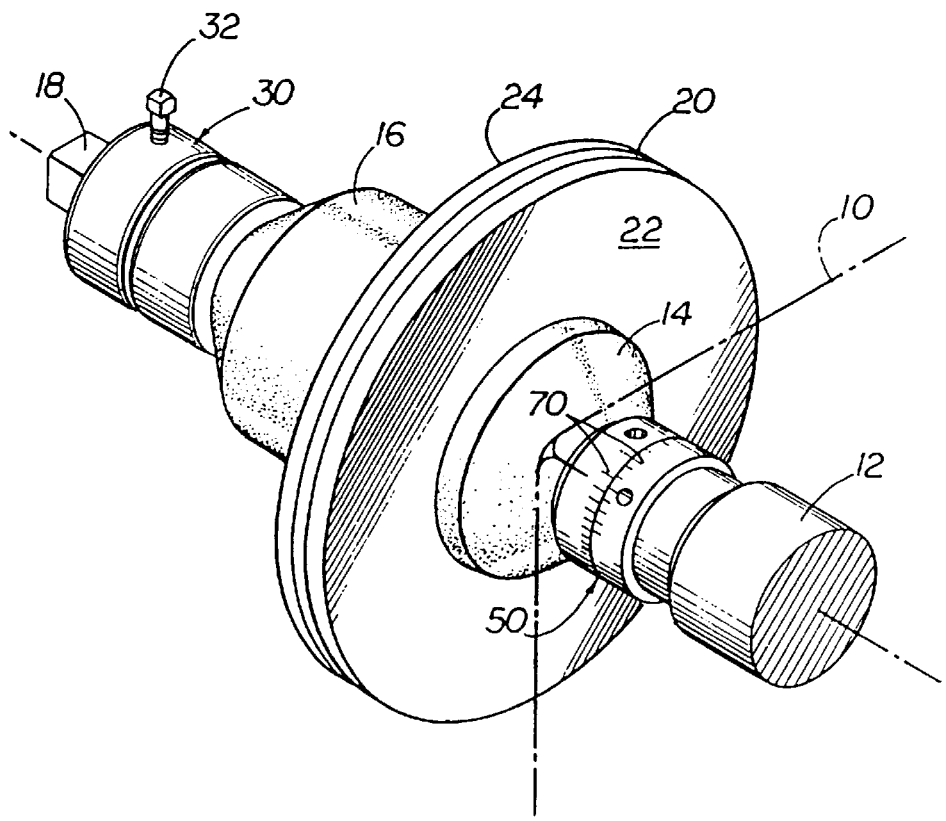
FIG. 2 is a perspective view of the invention shown in FIG. 1.

FIGS. 1 and 2 illustrate a lathe 10 having a headstock through which a spindle 12 passes and against which an arbor 19 is secured. Suspended from the arbor 19 is a brake rotor 20 defining a first side 22 and a second side 24. Brake rotor 20 is held firmly fixed by a first bell clamp 14, extending through an aperture in the first side 22, and a second bell clamp 16, each bearing against a circular skirt 26 attached to the second side 24. Within the first bell clamp 14 may be located a centering cone (not shown) that is biased away from the first bell clamp 14 to center the rotor in a true (perpendicular) relation to the arbor 19. Pressure is applied to clamp firmly the rotor 20 between the first and second bell clamps 14, 16 by adjusting load plate assembly 30 to apply pressure to first bell clamp 14, which thereby pushes rotor 20 and second bell clamp 16 against the runout compensator 50 that is located adjacent the headstock of the lathe 10.

Figure 3:
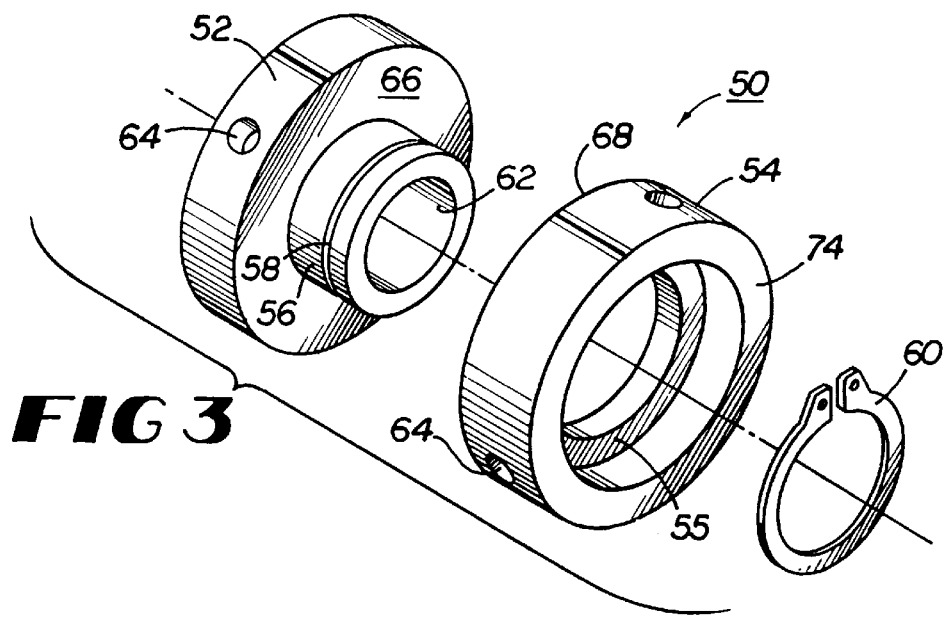
FIG. 3 is an exploded perspective view of one embodiment of a runout compensator.

Components of the runout compensator 50 are shown perhaps best in FIG. 3, illustrating an exploded perspective view of a first ring 52, a second ring 54 and a clip 60. First ring 52 defines a first mating surface 66 and a bore 62 through which will pass the arbor 19 and a shaft 56, which supports the second ring 54. Second ring 54 defines a second mating surface 68 and, directly opposite, a recessed shelf 55. Each of the first and second mating surfaces 66, 68 is machined, ground or otherwise manipulated to tilt or slant so that they are not perpendicular to the axis of their respective first and second rings 52, 54.

Figure 4:
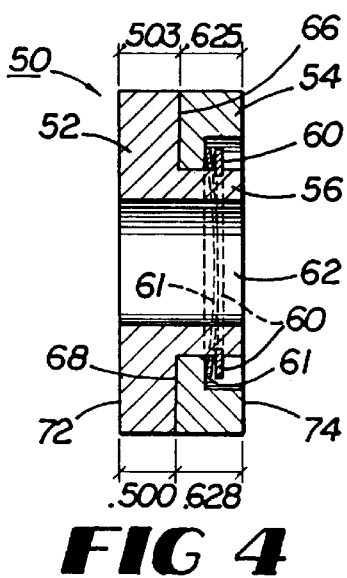
FIG. 4 is a diametrical cross sectional view of the runout compensator shown in FIG. 3 whose rings are set in a true position.
Figure 5:
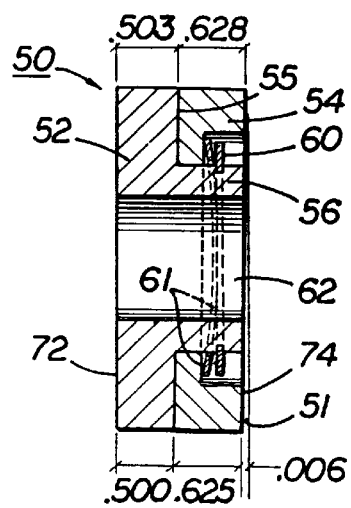
FIG. 5 is a diametrical cross sectional view of the runout compensator shown in FIG. 3 whose rings are angulated to compensate runout.

One embodiment of runout compensator 50 is produced by sliding the second ring 54 over the shaft 56, then placing the clip 60 into a circular channel 58 that surrounds the shaft 56. The runout compensator 50 defines a front face 74 and a rear face 72, each of which are perpendicular to the central axis of their respective rings. Wave washer 61 may be located between the clip 60 and the recessed shelf 55 to act as a spring to maintain contact between the first and second rings 52, 54, as shown in FIGS. 4 and 5. Clip 60, with wave washer 61, maintains sufficient pressure against the recessed shelf 55 to cause the first mating surface 66 to maintain contact with the second mating surface 68. Although the first and second rings 52, 54 should be manufactured to fit closely with one another, use of the wave washer 61 allows some variance in manufacturing tolerances since the bias of the wave washer 61 will force the first and second rings 52, 54 together. Such contact is maintained even when the first ring 52 and the second ring 54 are twisted or rotated with respect to one another by hand or, when more mechanical advantage is required, by using spanner wrenches to apply torque to the first and second rings 52, 54 through several cavities 64 located on their perimeters.

FIG. 4 illustrates the runout compensator 50 set in a first, true position so that a front face 74 is perfectly perpendicular with the central axis of the bore 62. In contrast, FIG. 5 illustrates the runout compensator 50 set to compensate runout, which is indicated by an area 51. (The dimensions provided are for illustrative purposes only). By twisting the first ring 52 relative to the second ring 54, the front face 74 is moved between a true position (zero slant) and a maximum runout position (maximum slant) because the slant machined into the first and second mating surfaces 66, 68 adds together and is translated to the front face 74 as the first and second rings 52, 54 are twisted.

In the maximum runout position shown in FIG. 5, the front face 74 defines a plane surface that crosses skew to the central axis of the bore 62. Because the bore 62 will rest upon the arbor 19 of the lathe 10, the slanted plane surface defined by the front face 74 also will cross skew to the arbor 19. However, a rear face 72 of the runout compensator 50 may define a plane directly perpendicular to the axis of the bore 62 (and thus the arbor 19) which allows the runout compensator 50 to interface with the shoulder of the arbor 19. Angulation attained by adjusting the second ring 54 with respect to the first ring 52 is thus translated to only the front face 74.

Attaching a bell or other type clamp to the front face 74 after correct angulation is achieved provides excellent surface contact (uninterrupted by shims) with the rotor 20 and tilts the rotor 20 to the position needed to compensate for the runout in the rotor 20 as it is machined. (Because there is space, or play, between the arbor 19 and the rotor 20, it can be tilted with respect to the arbor 19). Instead of butting the bell clamp 14 against the face surface of the runout compensator 50, the bell clamp 14 or another clamp can be directly attached to the appropriate face surface so that adjusting the runout compensator angulates the attached clamp.

Rear face 72 is held against the shoulder of the arbor 19 by the force produced by the load plate assembly 30, which has an outer plate 34, an inner plate 36 and a spring 38. Each of the outer and inner plates 34 and 36 respectively define an outer shoulder 35 and an inner shoulder 37, and together define a central bore 40 through which will pass the arbor 19. A threaded hole 31 holds a set screw 32 that may be tightened to bear against the arbor 19 and thereby prevent the rotation of the load plate assembly 30 about the arbor 19. Spring 38 exerts bias against the outer plate 34 and the inner plate 36 by exerting force against the outer shoulder 35 and the inner shoulder 37, respectively.

A retaining bolt 42 prevents the spring 38 from separating completely the outer and inner plates 34, 36. Partially threaded retaining bolt 42 slips into a hole 44 in the face of the inner plate 36. Hole 44 defines a shelf against which bears the head of the retaining bolt 42. The threaded end of the retaining bolt 42 threads into a threaded depression 46 bored in one face of outer plate 34 to prevent the spring 38 from forcing the inner plate 36 completely away from the outer plate 34. Loosening the retaining bolt 42 allows the inner plate 36 to be biased farther away from the outer plate 34 by the spring 38; tightening the retaining bolt 42 limits the amount of separation provided and the corresponding amount of bias available. The bias adjustably forces the second bell clamp 16 against the rotor 20, which in turn pushes against the first bell clamp 14 that interfaces with the front face 74 of the runout compensator 50. Because the runout compensator 50 is fixed by virtue of the rear face 72 bearing against one end of the arbor 19, the force produced by the load plate assembly 30 acts to compress the rotor 20 between the first and second bell clamps 14 and 16.

Other shapes may be used in place of the first and second rings 52, 54 for the runout compensator 50 so long as the desired amount of runout is reproduced. The circular shape of rings 52, 54 does, however, offer an advantage in that the runout produced by twisting or rotating the rings 52, 54 can more easily be matched with the runout in the actual rotor 20 being machined upon lathe 10. For example, match marks 70 can be provided on first and second rings 52, 54 in order to indicate to the user the amount of runout provided upon twisting the rings 52, 54 relative to one another.

Figure 6:
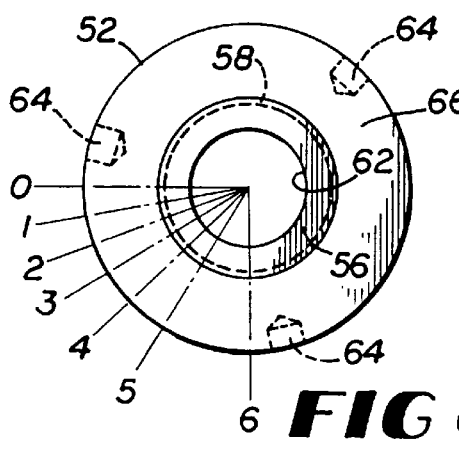
FIGS. 6 and 7 are top views of the rings of the runout compensator shown in FIGS. 3–5.
Figure 7:
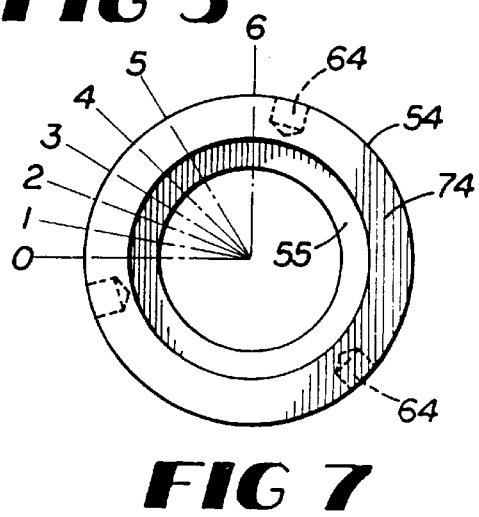
Figure 8:
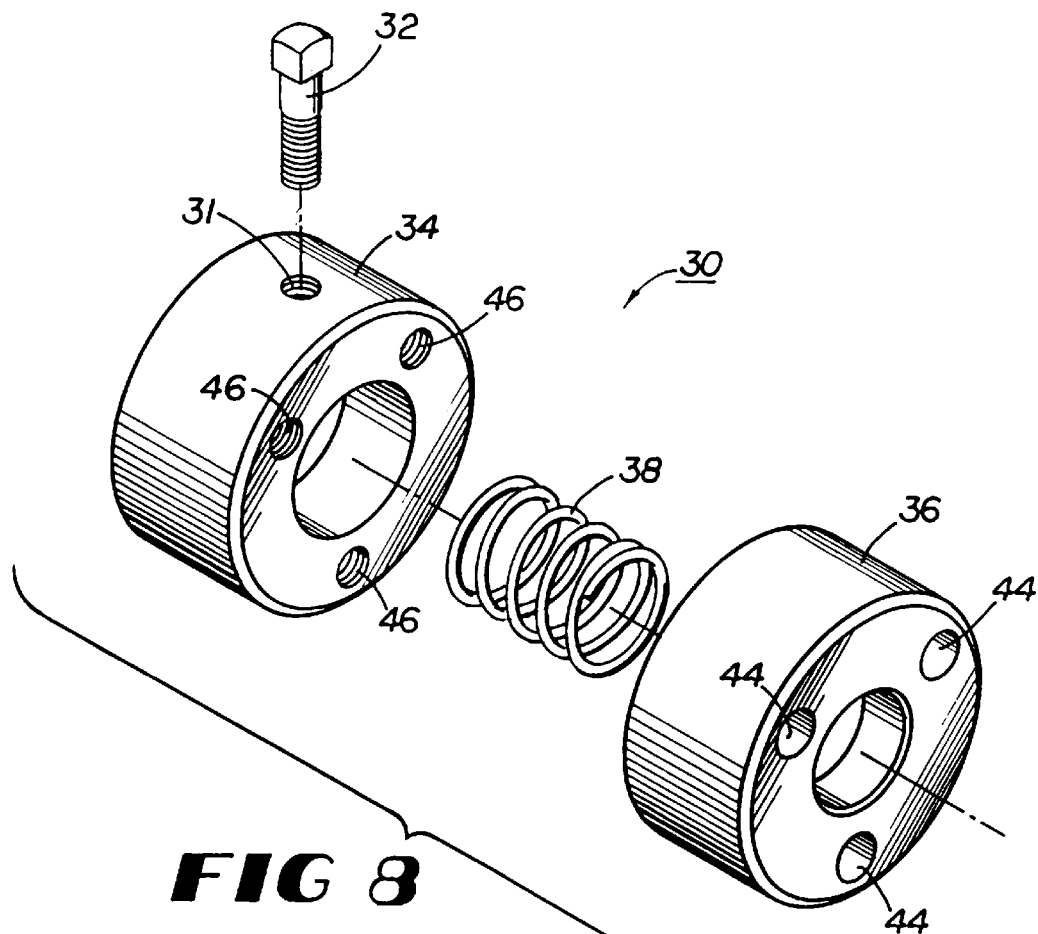
FIG. 8 is an exploded perspective view of a load plate assembly used with the runout compensator of the present invention.
Figure 9:
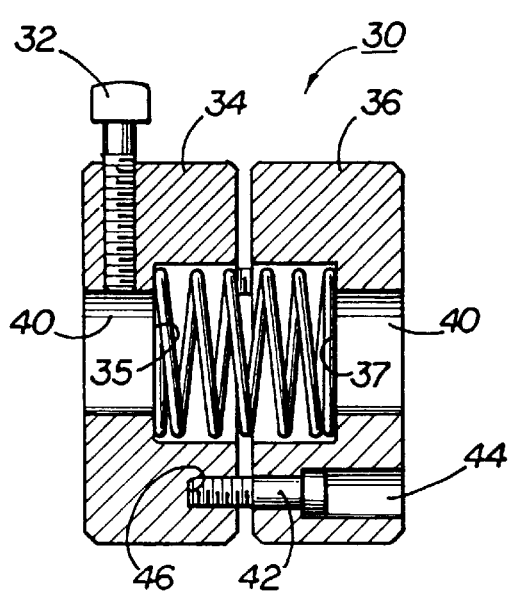
FIG. 9 is a side view of an assembled load plate assembly shown in FIG. 8.

For instance, as shown in FIG. 4, when the first and second rings 52, 54 are positioned so that the match marks 70 read 0-0 (not shown), the user will be assured that the runout compensator 50 is set in the true position (i.e., has face surfaces perpendicular to the arbor 19). A chart can be provided to show the user the degree of angulation or amount of displacement provided when the first and second rings 52, 54 are twisted to align the match marks 70 in the 0-0, 1-1, 2-2, 3-3, 4-4, 5-5, 6-6 or other position. A set of the match marks 70 is illustrated at FIGS. 6 and 7 with each numeral corresponding to its counterpart on the first or second ring 52, 54. As the numerals increase, so does the degree of slant as measured from the reference point (i.e., the point indicated by numeral 0) and the point indicated by the particular numeral. Thus, the point indicated by 3 has more slant than the point indicated by 2, but less slant than the point indicated by 4.

Having already calculated the runout (either the linear difference between the surfaces of the rotor 20 and the machined swath or the angulation of the surfaces of rotor 20 in relation to true), the user can use the known values of slant or tilt created by the runout compensator 50 when the match marks 70 are aligned in particular combinations, thereby allowing runout to be properly matched. Knowing the angulation or displacement provided by the runout compensator 50 when the match marks 70 are aligned in a particular relationship allows the user to adjust the runout compensator 50 to compensate properly for the previously determined runout in the rotor 20.

There are numerous ways to tilt or angulate the runout compensator's front face 74 to match the desired runout. First, the front face 74 can be angulated to slant at an angle matching the angular runout of the surfaces of the rotor 20. Second, the actual linear displacement of the front face 74 from a reference point can be calculated (i.e., the "high" and "low" points of the front face 74 relative to true). This linear displacement is then matched with the linear displacement determined by measuring the high and low spots on the surfaces of the rotor 20.

However, if (as is normally the case) the radius of the front face 74 is different from the radius of the rotor 20, there will not be a one-to-one correspondence between the linear displacement of the front face 74 and the linear measurement of runout in the rotor 20. Although the linear measurements can be reconciled by application of trigonometric equations, such calculations are difficult and time consuming. Thus, instead of laboriously calculating the runout or displacement at which to set the runout compensator 50 for a particular sized rotor 20 having a particular amount of runout, a chart can also show that information for each particular rotor size (i.e., an 8-inch, 10-inch or 12-inch diameter rotor). For instance, the chart could show that 0.003" (three thousandths of an inch) runout at the edge of an 8" (eight inch) diameter rotor corresponds to a 3-3 match mark 70 setting on the runout compensator 50 and the same runout on the edge of a 12" (twelve inch) diameter rotor corresponds to a 2-2 setting. Standard interpolation calculations allow the user easily to derive any settings not shown upon the chart.

Operation of the runout compensator 50 is accomplished by first machining a portion of the rotor 20 to establish a "true" reference surface to measure from and then replacing the rotor 20 onto the vehicle in its original position. The runout of the rotor 20 is measured while it is on the vehicle and marking both the high spot on the outside face of the rotor 20 and the original position of the rotor 20 are marked. Rotor 20 is then removed from the vehicle and remounted on the lathe 10. Load plate assembly 30 is adjusted by screwing the retaining bolt 42 until only a fraction (e.g., 1/32) of an inch is visible between the outer and inner plates 34, 36. The set screw 32 is locked down to prevent the load plate assembly 30 from rotating as the runout compensator 50 is adjusted. The high mark on the rotor 20 is then aligned with match marks 70 on the runout compensator 50. Generally, alignment is accomplished by holding the rotor 20 and using a spanner wrench on the inside nearest to the second ring 54 of the runout compensator 50 and rotating the runout compensator 50 until it is aligned with the high mark.

Using two spanner wrenches, the runout compensator 50 is then adjusted to angulate the front face 74 to compensate the runout. As the runout compensator 50 is adjusted, the user may be required to realign the match marks 70 with the high spot marked on the rotor 20, as described above. The amount of angulation can be determined by the methods previously described, that is through calculation, comparing the measured runout to a chart showing corresponding match mark settings or estimation. As the front face 74 is tilted by adjustment of the runout compensator 50, the bell clamp 14 attached to that front face 74 also tilts. By holding the rotor 20 firmly against the tilted, non-perpendicular bell clamp 14, the surfaces of the rotor 20 are held in a parallel relation with the machining tool, despite the runout in the surfaces of the rotor 20. Once the runout is compensated, the set screw 32 is loosened, the arbor nut 18 is tightened and the rotor 20 is machined.

The rotor 20 is then remounted on the vehicle in its original position (matching the mark indicating the high spot and the mark showing the original position). Because the brake calipers of the runout compensator 50 are no longer misaligned with the surfaces of the rotor 20 and will not wear down the rotor 20 as quickly, the brakes will achieve generally higher efficiency.

The foregoing is provided for purposes of illustrating, explaining and describing one embodiment of the present invention. Modifications and adaptations to the described embodiment will be apparent to those of ordinary skill in the art and may be made without departing from the scope or spirit of the invention and the following claims.

What is claimed is:

1. A runout compensator, comprising:
   (a) a male ring penetrated by a male ring bore, said male ring including a male rind outer face; a substantially planar male ring mating surface skewed relative to said longitudinal axis of said male ring bore; and a shaft projecting from said male ring mating surface, said shaft penetrated by said male ring bore; and
   (b) a female ring received by said male ring, said female ring penetrated by a female ring bore, said female ring including a female ring outer face; and a substantially planar female ring mating surface skewed relative to said longitudinal axis of said female ring bore, said female ring adapted to receive said male ring shaft to allow said female ring to rotate relative to said male ring, whereby abutment of said male ring mating surface and said female ring mating surface against each other cause said male ring outer face to angulate relative to said female ring outer face.

2. The compensator of claim 1 in which the female ring further comprises a cavity in said female ring outer face, said cavity adapted to accommodate a retainer for retaining said female ring on said male ring.

3. The compensator of claim 2 further comprising a retainer.

4. The compensator of claim 1 wherein:
   (a) said male ring outer face and said substantially planar male ring mating surface of said male ring cooperate to cause said male ring thickness to vary about the periphery of said male ring, thereby creating a male ring maximum thickness radius, and a male ring minimum thickness radius located substantially diametrically from said male ring maximum thickness radius;
   (b) said female ring outer face and said substantially planar female ring mating surface of said female ring cooperate to cause said female ring thickness to vary about the periphery of said female ring, thereby creating a female ring maximum thickness radius, and a female ring minimum thickness radius located substantially diametrically from said female ring maximum thickness radius;
   (c) wherein, when said male ring maximum thickness radius is substantially aligned with said female ring minimum thickness radius, said male ring outer face is substantially parallel with said female ring outer face.

5. A runout compensator, comprising:
   (a) a male ring penetrated by a male ring bore, said male ring including a male ring outer surface; a substantially planar male ring mating surface; one of said surfaces skewed relative to said longitudinal axis of said male ring bore; and a male ring shaft projecting from said male ring mating surface, said shaft penetrated by said male ring bore;
   (b) a female ring received by said male ring, said female ring penetrated by a female ring bore, said female ring including a female ring outer face and a substantially planar female ring mating surface, one of said surfaces skewed relative to said longitudinal axis of said female ring bore, said female ring adapted to receive said male ring shaft;
   (c) said male ring outer surface and said male ring mating surface cooperate to cause said male ring thickness to vary about the periphery of said male ring, thereby creating a male ring maximum thickness radius, and a male ring minimum thickness radius;
   (d) said female ring outer surface and said female ring mating surface cooperate to cause said female ring thickness to vary about the periphery of said female ring, thereby creating a female ring maximum thickness radius, and a female ring minimum thickness radius;
   (e) wherein, when said male ring maximum thickness radius is substantially aligned with said female ring minimum thickness radius, said male ring outer surface is substantially parallel with said female ring outer surface and wherein abutment of said male ring mating surface and said female ring mating surface against each other cause said male ring outer surface to angulate relative to said female ring outer surface as the rings are rotated relative to each other.

6. A compensator according to claim 5 further including markings on a periphery of at least one of said male ring or said female ring, said markings adapted to indicate relative skew between said outer surfaces of said male ring and said female ring.

7. A compensator according to claim 5 further comprising a cavity in at least one of said rings, said cavity adapted to accommodate a retainer for retaining said male ring and said female ring substantially together.

8. A compensator according to claim 5 further comprising a biasing structure for applying relative bias between said male ring and said female ring, in order at least to create friction between said male ring and said female ring.

9. A compensator according to claim 5 further comprising a retainer for retaining said male and female ring substantially together and for applying relative bias between said male ring and said female ring in order to create friction between said male ring and said female ring.

10. A compensator according to claim 5 in which the maximum thickness radius of at least one of said rings is located substantially diametrically from said minimum thickness radius.

\* \* \* \* \*